United States Patent
Charoosaie et al.

(10) Patent No.: US 12,351,113 B2
(45) Date of Patent: Jul. 8, 2025

(54) VEHICLE MOUNTED SAFE

(71) Applicants: Hamid Charoosaie, Phoenix, AZ (US); Ryan Orton, Scottsdale, AZ (US); Robert J Guyser, Niles, MI (US)

(72) Inventors: Hamid Charoosaie, Phoenix, AZ (US); Ryan Orton, Scottsdale, AZ (US); Robert J Guyser, Niles, MI (US)

(73) Assignee: License Plate Safe, LLC, Scottsdale, AZ (US)

( * ) Notice: Subject to any disclaimer, the term of this patent is extended or adjusted under 35 U.S.C. 154(b) by 99 days.

(21) Appl. No.: 18/108,194

(22) Filed: Feb. 10, 2023

(65) Prior Publication Data

US 2024/0270183 A1    Aug. 15, 2024

(51) Int. Cl.
B60R 13/10 (2006.01)

(52) U.S. Cl.
CPC .................. B60R 13/105 (2013.01)

(58) Field of Classification Search
CPC ......... A47G 1/12; B60R 13/105; E05B 73/00; E05B 73/0058; E05B 19/0005; E05G 1/005; E05G 1/024
USPC .............. 220/522; 312/204; 70/14, 58, 63, 70/158–164; 109/45, 50, 54, 58, 58.5, 109/59 R
See application file for complete search history.

(56) References Cited

U.S. PATENT DOCUMENTS

| | | | | |
|---|---|---|---|---|
| 2,649,799 A | * | 8/1953 | Spertus | A47G 1/143 40/724 |
| 4,232,474 A | * | 11/1980 | Dyer | A63H 33/30 109/43 |
| 4,304,447 A | * | 12/1981 | Ellwood | A47G 1/02 312/227 |
| 6,349,494 B1 | * | 2/2002 | Haggarty-Robbins | G09F 1/12 40/792 |
| 7,535,343 B1 | * | 5/2009 | Pinckney | G09F 21/04 40/575 |
| 7,866,071 B1 | * | 1/2011 | Downey | B60R 13/105 40/209 |
| 10,814,833 B1 | | 10/2020 | Goetzinger et al. | |

(Continued)

FOREIGN PATENT DOCUMENTS

GB    2414107 A  * 11/2005 ............. B60R 13/10

OTHER PUBLICATIONS

Foxxvault, https://www.kickstarter.com/projects/foxxvault/foxxvault-protect-the-keys-to-your-life-go-forward, Screen shot taken Feb. 9, 2023.

(Continued)

*Primary Examiner* — Cassandra Davis
(74) *Attorney, Agent, or Firm* — Venjuris, P.C.

(57) ABSTRACT

This invention is embodied in a vehicle mounted safe that also can be used as a license plate frame. This invention provides a safe and hidden method to hide car key and small valuables outside the cabin of the vehicle. This is particularly advantageous on an outdoor adventure where it is not desirable to carry car keys (surfing, hiking, running, snowboarding, car-rental, car-sharing, etc.) or in a. The invention (a) stores keys and valuables, (2) makes it easier to swap out license plates, and (3), prevents theft of the license plate—all without the need for any tools or screws. The metal design can block the RFID signals from a smart key.

12 Claims, 4 Drawing Sheets

(56) References Cited

U.S. PATENT DOCUMENTS

| | | | |
|---|---|---|---|
| 2012/0068492 A1* | 3/2012 | Lucas | B60R 7/02 |
| | | | 296/37.1 |
| 2013/0113350 A1* | 5/2013 | Lee | A47G 25/06 |
| | | | 312/224 |
| 2015/0113846 A1* | 4/2015 | Nicholson | A45C 11/16 |
| | | | 40/723 |
| 2020/0189476 A1* | 6/2020 | Consolacion | G07C 5/02 |

OTHER PUBLICATIONS

Biigvault, https://www.biigvault.com, Screen shot taken Feb. 9, 2023.

Phrame, https://www.fundable.com/phrame, Screen shot taken Feb. 9, 2023.

Dry Spec, https://dryspec.com/products/stash-box-lockable-motorcycle-license-plate-storage-box, Screen shot taken Feb. 9, 2023.

* cited by examiner

VEHICLE MOUNTED SAFE

FIELD OF THE INVENTION

This invention relates to devices for locking valuables, and more particularly to devices for locking valuables within a frame for holding automobile license plates.

BACKGROUND

There are many situations where it would be advantageous to be able to lock car keys and other valuables on a car-mounted safe. For example, when adventuring outdoors (surfing, hiking, running, snowboarding, etc.), many people do not want to take their car keys and other valuables with them. It would be advantageous to be able to lock car keys and other valuables on a car-mounted safe. Likewise, in car-rental or car-sharing scenarios, it would be advantageous to be able to lock a key on the outside of a vehicle. While there are various "hide-a-key" options available, those options are well-known and thieves know where to look for them (under wheel wells, bumpers, etc.)

In addition, car dealerships often must switch out dealer plates during the sales process. While it is not particularly difficult to change two screws, it does take time.

What is needed is a lockable storage device that is mounted to a car in an unexpected way, and one that makes it easier to switch out one license plate for another.

SUMMARY OF INVENTION

This invention is embodied in a safe that can be mounted to a vehicle where the rear license plate would be mounted. The vehicle-mounted safe doubles as a frame for the license plate, which prevents the license plate from being stolen. In addition, the safe can also store keys and other valuables. The metal design also blocks the RFID signal from a smart key. This invention can be used on any vehicle that uses a license plate (e.g., cars, trucks, vans, motorcycles, off-road vehicles, etc.)

This invention provides a safe and hidden method to hide a car key and small valuables on the outside of the vehicle while preventing license plate theft. This is particularly advantageous on an outdoor adventure where it is not desirable to have to bring car keys (surfing, hiking, running, snowboarding, car-rental/car-sharing scenario, etc.).

The novel feature of this invention is that it (a) stores valuables, like a key, (2) prevents theft of the license plate, and (3) makes it easier to swap out license plates—all without the need for any tools or screws.

BRIEF DESCRIPTION OF THE DRAWINGS

The objects, features and advantages of the present invention will be more readily appreciated upon reference to the following disclosure when considered in conjunction with the accompanying drawings, wherein reference numerals are used to identify the components in the various views.

DESCRIPTION OF THE PREFERRED EMBODIMENTS

Figure 1:
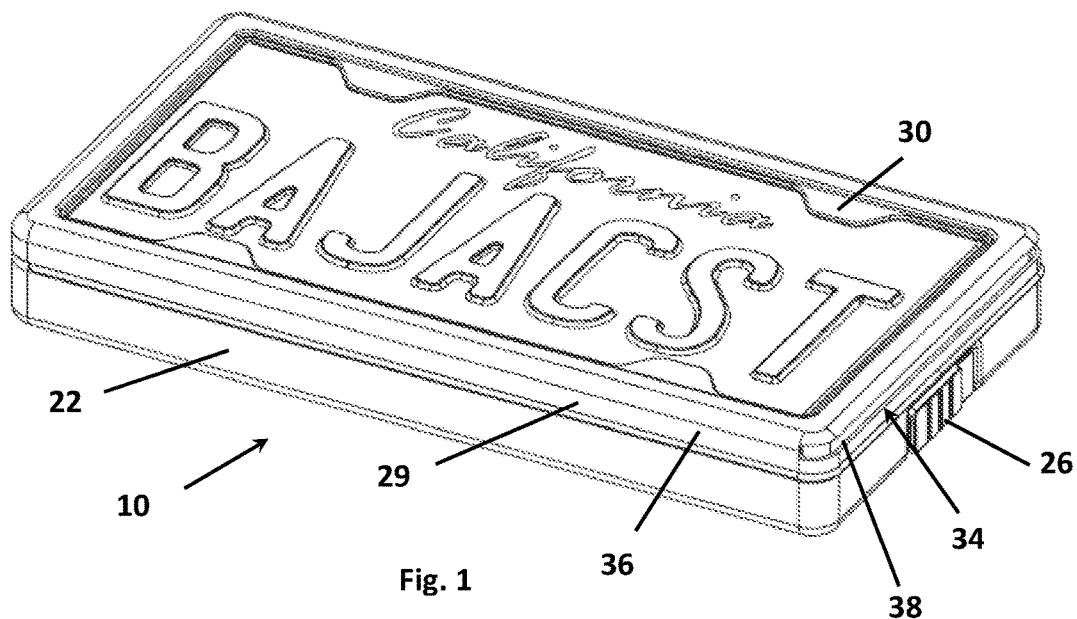
FIG. 1 illustrates a perspective view of an embodiment of the invention with a license plate installed in the "closed position."
Figure 2:
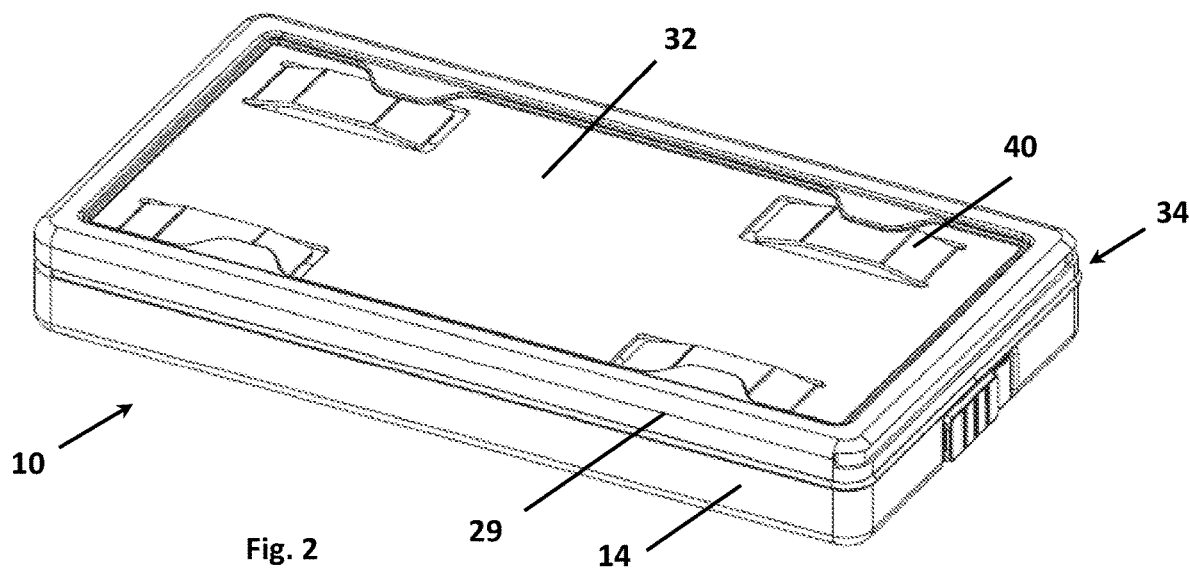
FIG. 2 illustrates a perspective view of FIG. 1 with the license plate removed.
Figure 3:
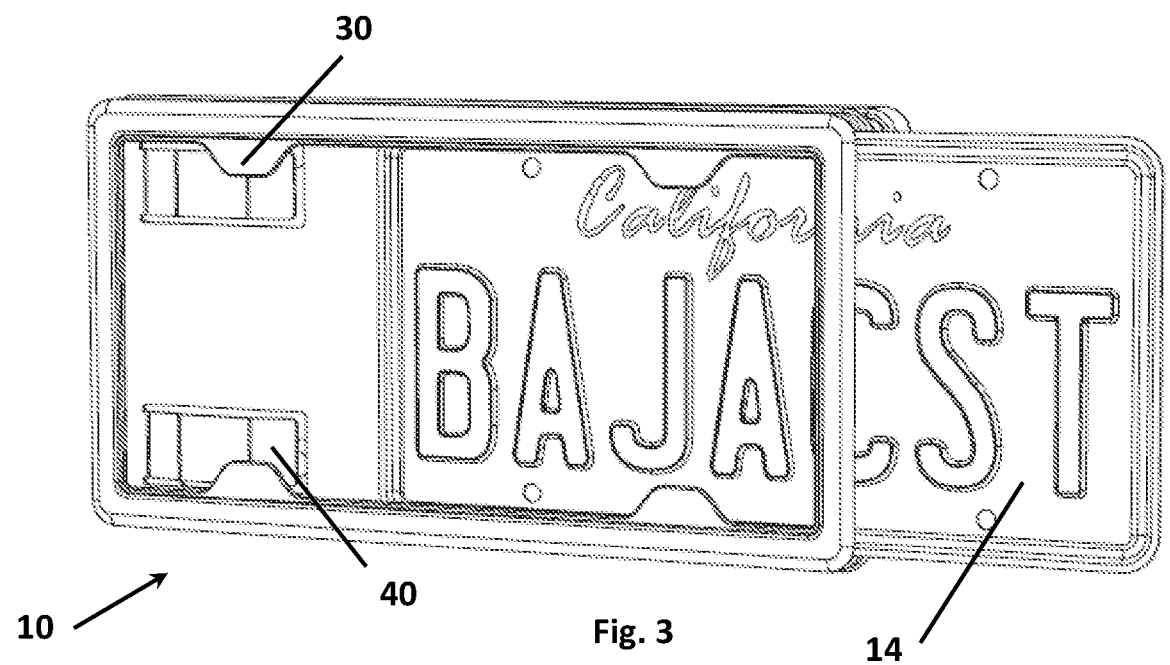
FIG. 3 illustrates a view of FIG. 1 with the license plate partially removed via the slot.

This invention is embodied by the device shown in FIGS. 1-7. The preferred device 10 is a license plate holder that also comprises a lockable interior compartment 12. As shown in FIG. 3, the device 10 has a base frame 14 and a door 16. A hinge 18 connects the base frame 14 to the door 16. It is preferred to manufacture the device 10 out of metal. Among other things, metal can block RFID signals from a smart key.

The base frame 14 comprises a backwall 20 and side walls 22. The backwall 20 has holes 24 for fasteners that can secure the base frame 14 to a car. Typically, the fasteners would be threaded machine screws. A lock 26 is preferably mounted to the sidewall on the opposite side as the hinge 18. It is preferred to have a combination lock so that no key is needed. An optional insert 28 can be connected to the sidewalls. See, FIGS. 4-5. The primary purpose of the optional insert 28 it to hold items inside the interior compartment 12 when the door 16 is open.

The door 16 preferably comprises two elements: a plate frame 29 and a plate backer 32. The plate frame 29 is for holding a license plate 42. Tabs 30 retain the license plate within the plate frame 29 on the top side. The plate frame 29 further comprises plate frame walls 36 that retain the license plate within the plate frame 29 on the three sides. On the fourth side is a slot 34 for receiving a license plate. When the door 16 is in the open position, the slot is open and a user can slide a license plate in or out. When the door 16 is closed, extension wall 38 covers the slot so the license plate cannot be removed.

Figure 4:
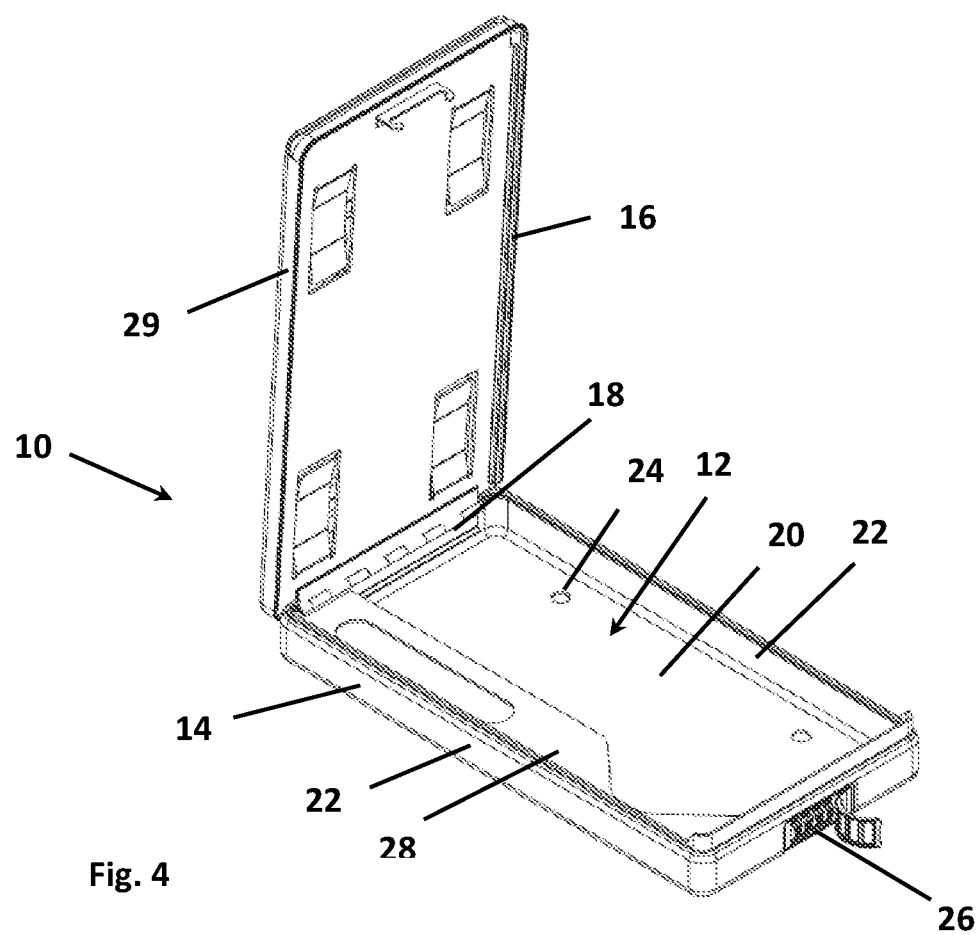
FIG. 4 illustrates a view of FIG. 1 with the door open (the "open position").
Figure 5:
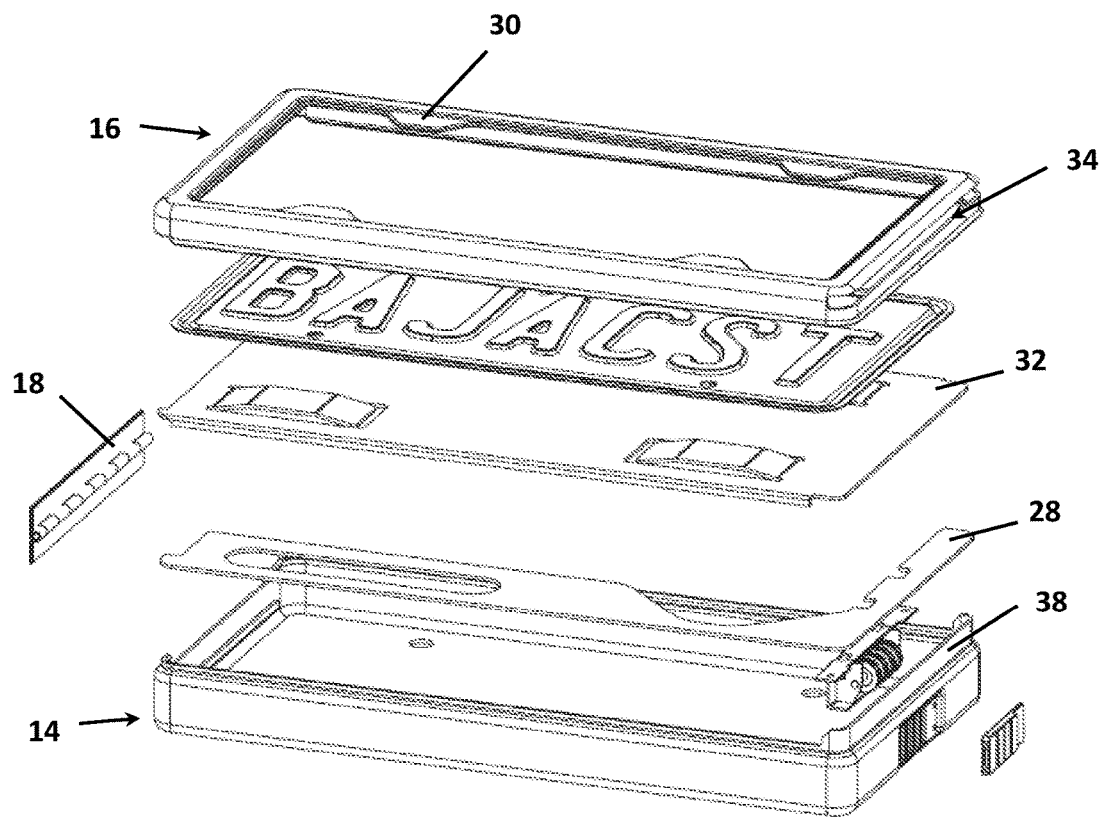
FIG. 5. illustrates an exploded view of FIG. 1.
Figure 6:
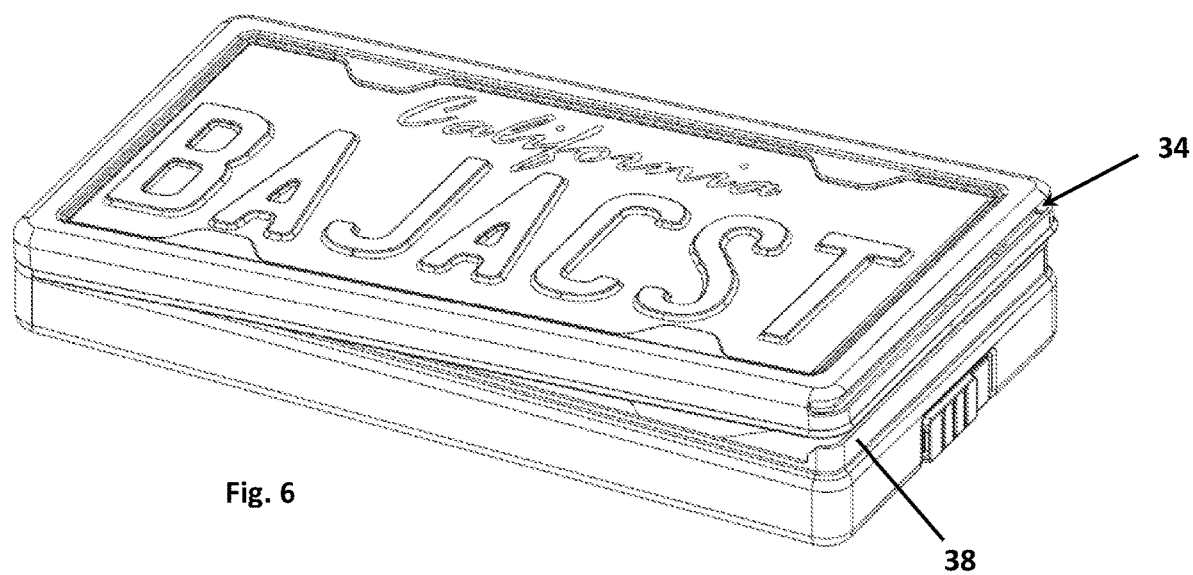
FIG. 6 illustrates a view of FIG. 1 with the door slightly ajar (also the open position).
Figure 7:
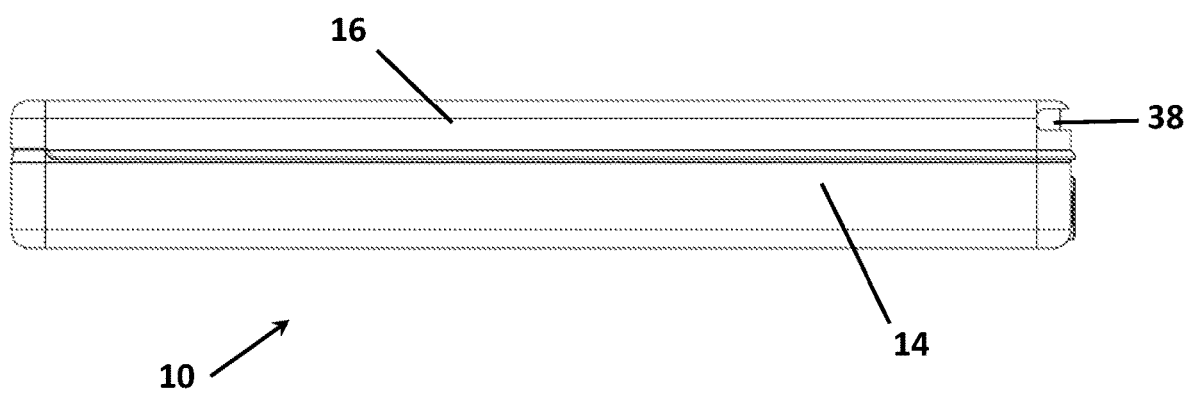
FIG. 7 illustrates a side view of FIG. 1 in the closed position, with the extension wall 38 blocking the slot 34.

The extension wall 38 is connected to the top of the side wall 22 of the base frame 14. It is preferred that the extension wall 38 be molded as one piece with the base frame 14, but other methods of joining the extension wall 38 to the base frame 14 could also work. It is preferred to wrap the extension wall 38 onto adjacent side walls 22 for additional structural stability as shown in FIG. 4.

The plate backer 32 holds the license plate within the plate frame 29 on the back side. That way when the door 16 is open the plate 42 stays within the plate frame 29 and does not fall out on the back side. Optional spring tabs 40 can be used on the plate backer to keep the license plate fixed within the frame and to keep the plate from rattling around. The spring tabs 40 are configured to bias the plate 42 upward against the top inside of the plate frame 29.

The preferred way to use the device 10 is to first mount it to a car using machine screws via the holes 24 in the back wall 20. Once the device is mounted to the car, the device 10 can be used to hold a license plate and to lock keys and other valuables inside the interior compartment 12.

To install a license plate, the door 16 must be in the open position. When the door 16 is open, a user can add or remove a license plate via slot 34.

With the door 16 open, keys and other valuable can be added to the interior compartment 12. Optional insert 28 can be used to hold items in the interior compartment when the door is open.

When the door 16 is closed, extension wall 38 will cover the slot 34 so that the license plate can no longer be removed or replaced. When the door is closed, lock 26 can engage receiver 44 to lock the contents of the interior compartment 12. Receiver 44 is preferably mounted to the inside face of the door 12. Receiver 44 is configured to mate with the lock 26 in the locked position.

While the invention has been described by means of specific embodiments, numerous modifications and variations could be made thereto by those ordinarily skilled in the art without departing from the score and spirit disclosed herein. For example, the description and drawings shown are primarily directed to an automobile license plate embodiment. But a person of skill in the art could adapt these teachings to fit a motorcycle or other vehicle without departing from the spirit of the invention.

The invention claimed is:

1. A vehicle mounted safe comprising,
   a base frame connected to a door via a hinge,
   an interior compartment formed within the base frame when the door is in a closed position,
   the base frame comprising a side wall, the sidewall comprising a lock,
   the door comprising a plate frame and a plate backer, the plate frame comprising three plate frame walls for retaining a license plate on three sides, a fourth plate frame wall comprising a slot for receiving and removing a license plate, and
   an extension wall connected to the base frame, the extension wall covering the slot when the door is in the closed position.

2. The vehicle mounted safe of claim 1, wherein the lock is a combination lock.

3. The vehicle mounted safe of claim 1, wherein the extension plate is connected to the base frame.

4. The vehicle mounted safe of claim 1, the plate backer configured to retain a bottom of a license plate.

5. The vehicle mounted safe of claim 1 further comprising springs connected to the plate backer, the springs creating an upward bias when a license plate is held within the plate frame.

6. The vehicle mounted safe of claim 1, the plate frame further comprising tabs configured to retain a license plate within the plate frame.

7. The vehicle mounted safe of claim 1 further comprising an insert connected to the base frame, the insert configured to hold items in the interior compartment when the door is in the open position.

8. A license plate holder comprising,
   a base frame for mounting to a vehicle, the base frame comprising a perimeter of side walls that define an interior compartment,
   a door hingedly connected to the base frame, the door comprising a slot for receiving a license plate, the door comprising an open position and a closed position, and
   an extension wall connected to the base frame, the extension wall configured to cover the slot when the door is in the closed position.

9. The license plate holder of claim 8 further comprising a lock mounted to the base frame, the lock configured to lock the door to the base frame.

10. The license plate holder of claim 8 further comprising an interior compartment positioned within the base frame.

11. The license plate holder of claim 8, the door further comprising a plate frame and a plate backer.

12. The license plate holder of claim 11, the plate frame comprising three plate frame walls for retaining a license plate on three sides, and a fourth plate frame wall comprising the slot.

* * * * *